Figure 9:
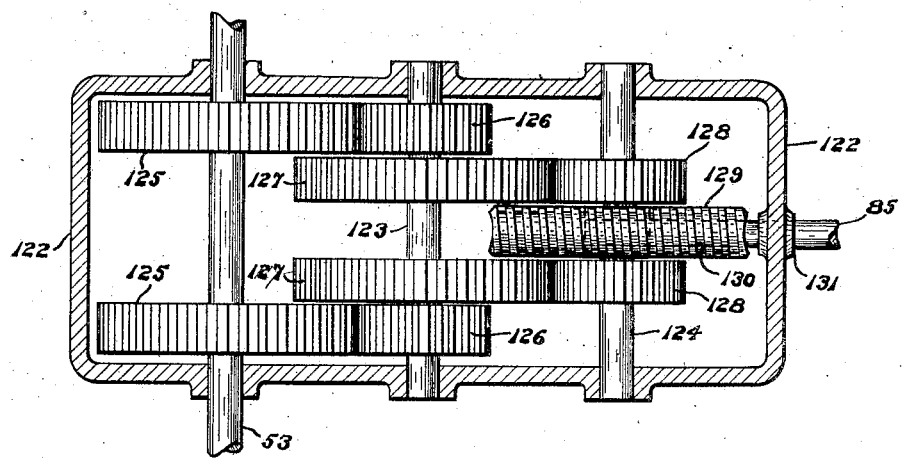

Apr. 24, 1923.
J. GASSER
1,452,501
COMBINED HIGH HOIST AND DUMP WAGON
Filed Jan. 12, 1922      5 Sheets-Sheet 1
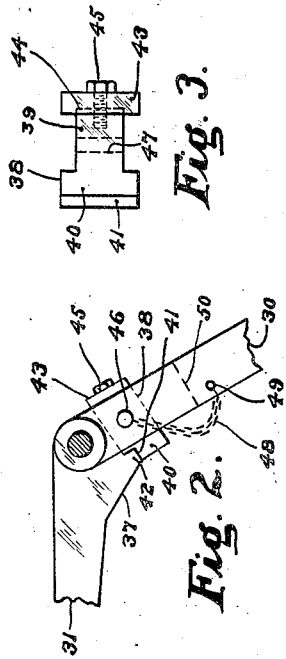
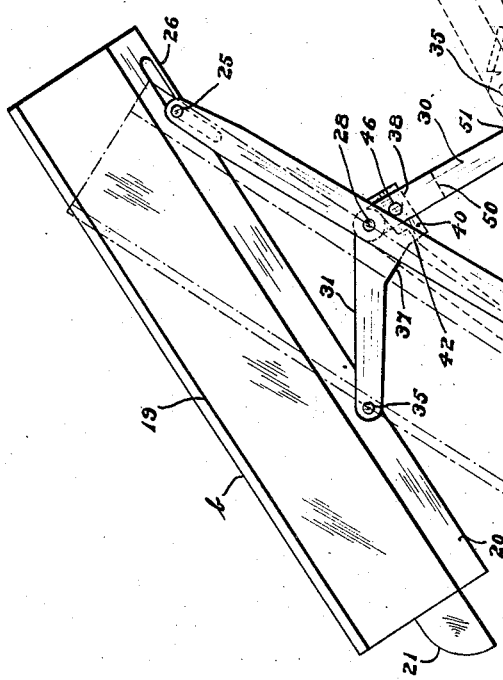
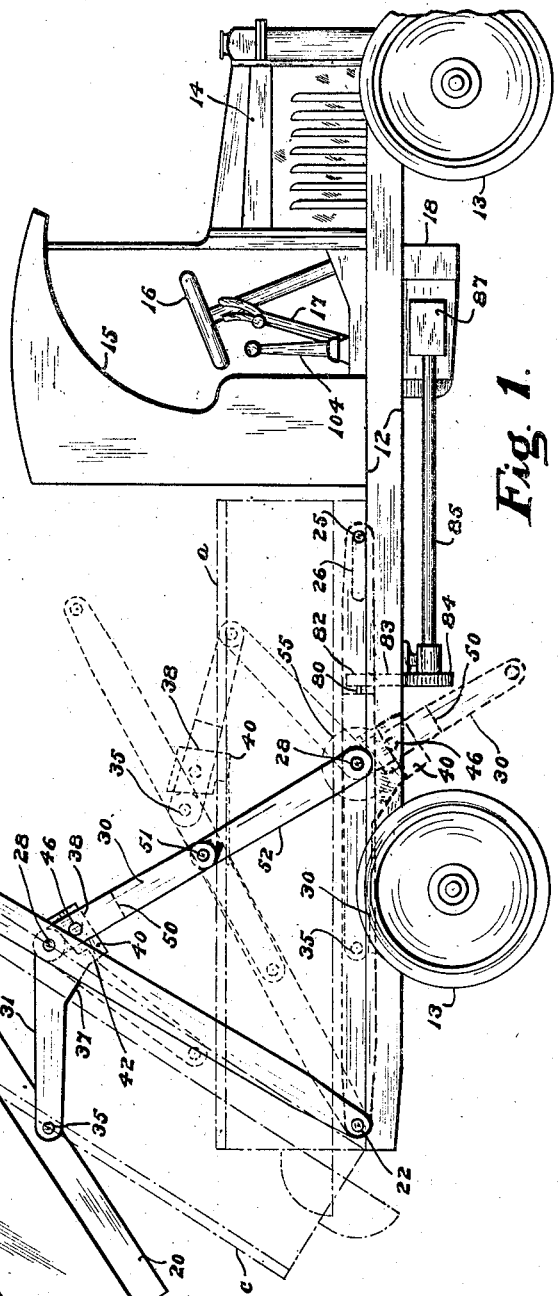
Joseph Gasser.
Inventor

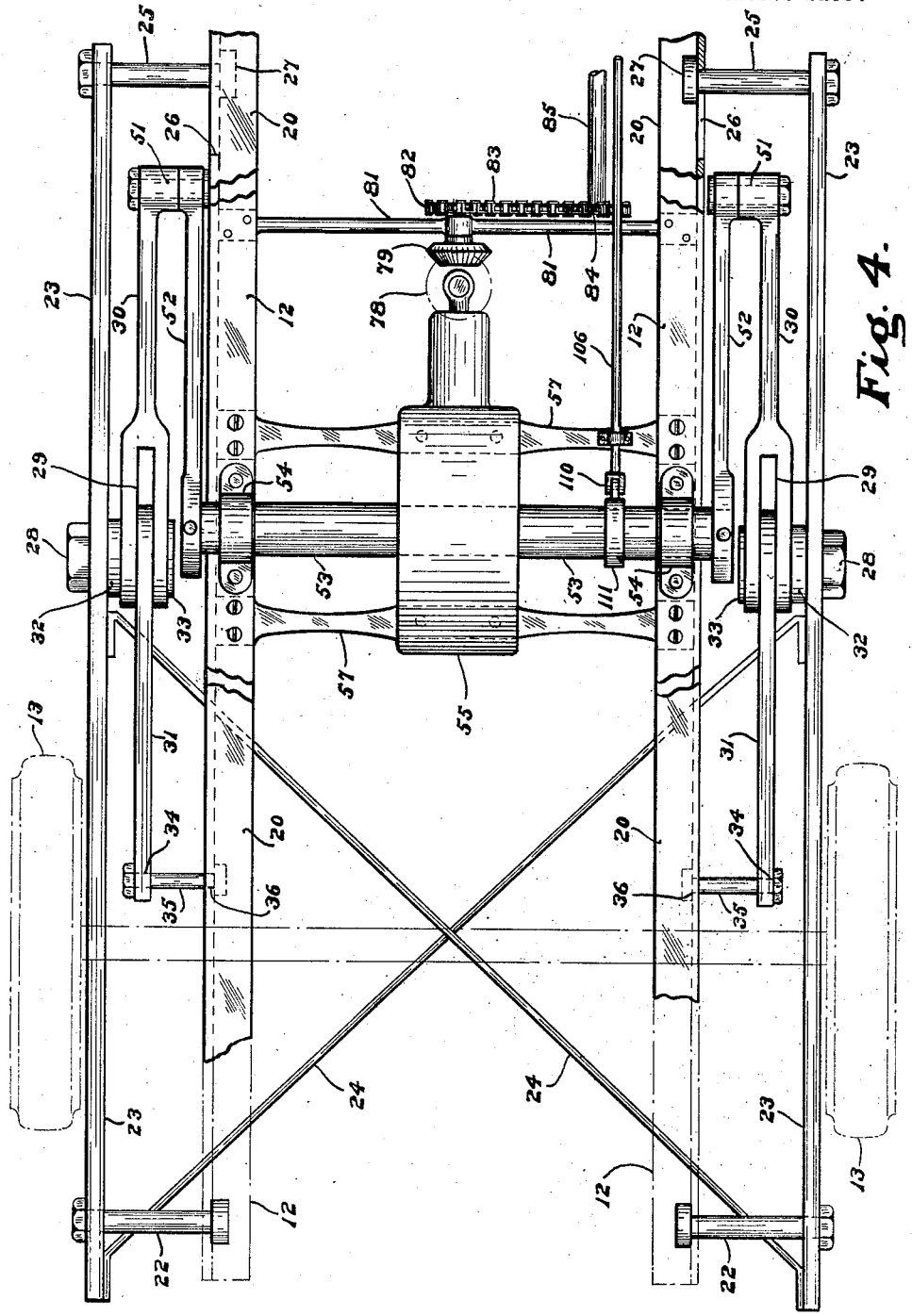

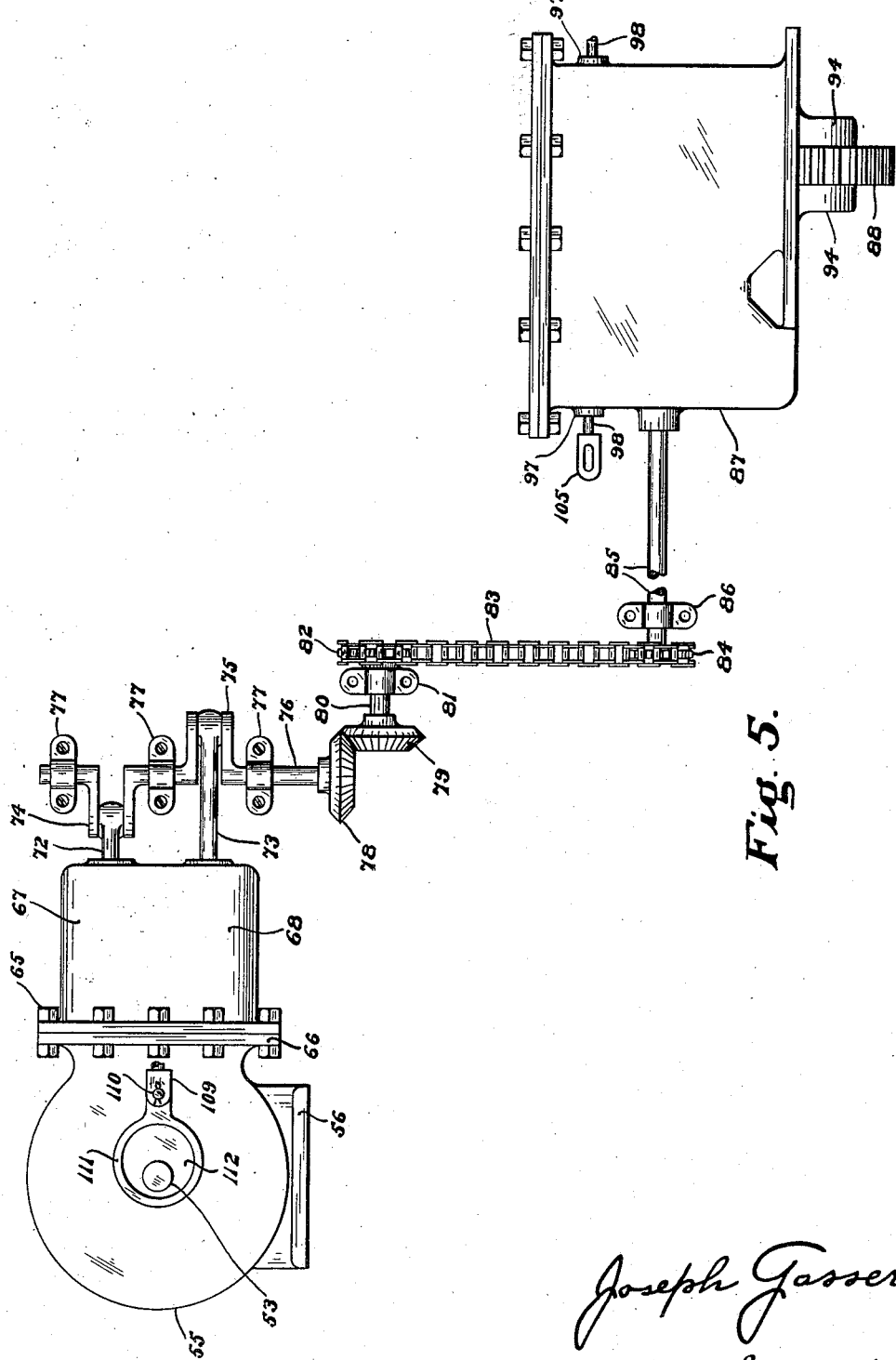

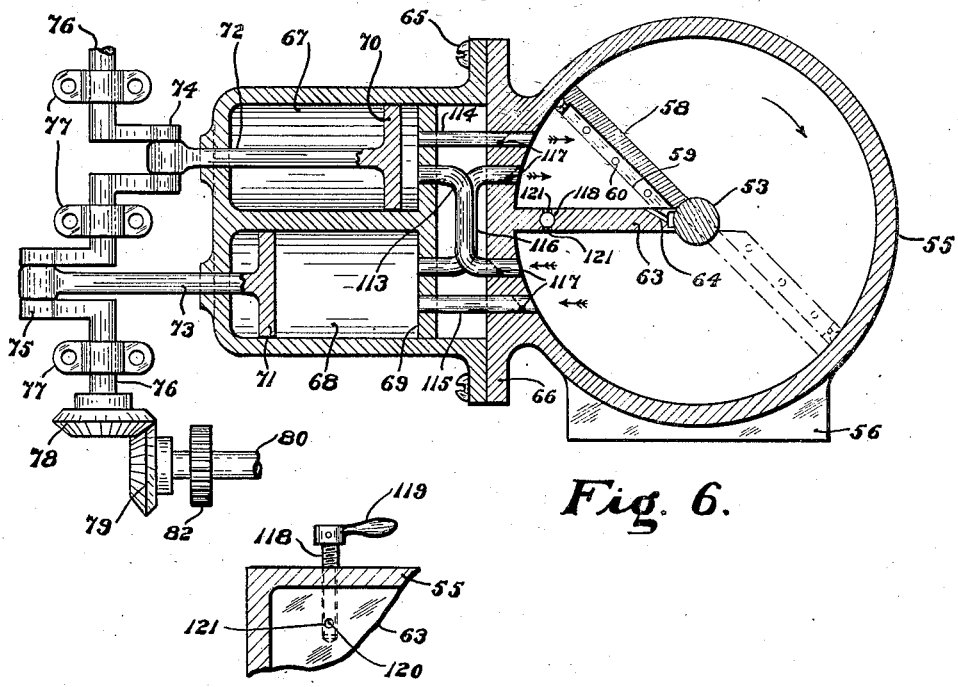
Fig. 6.
Fig. 7.
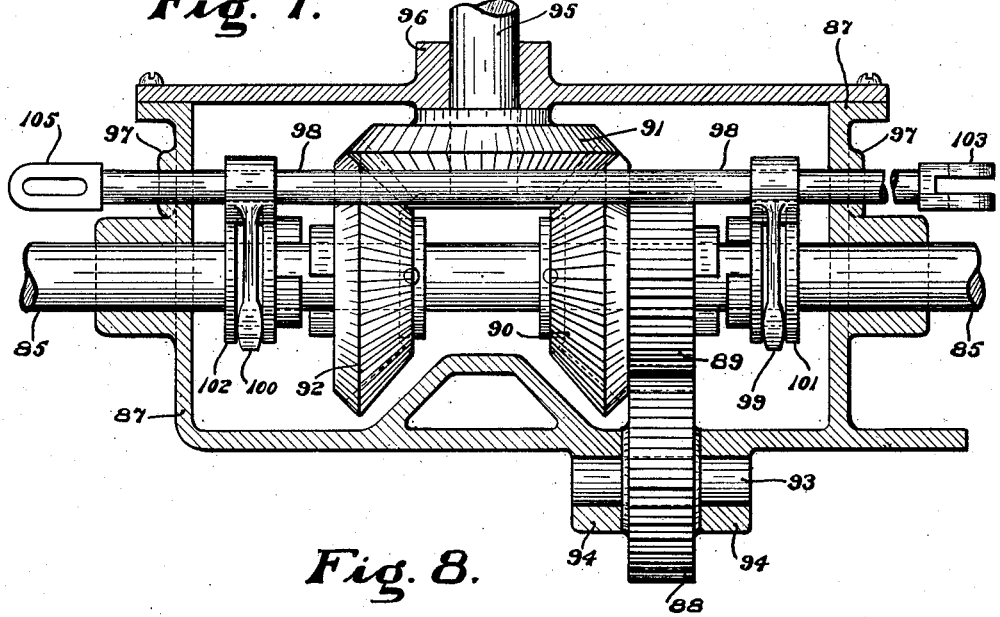
Fig. 8.
Joseph Gasser.
Inventor

Joseph Gasser.
Inventor.

Patented Apr. 24, 1923.

1,452,501

UNITED STATES PATENT OFFICE.

JOSEPH GASSER, OF TRENTON, NEW JERSEY.

COMBINED HIGH-HOIST AND DUMP WAGON.

Application filed January 12, 1922. Serial No. 528,634.

*To all whom it may concern:*

Be it known that I, JOSEPH GASSER, a citizen of the United States, residing at 402 Greenwood Avenue, in the city of Trenton, county of Mercer, and State of New Jersey, have invented new and useful Improvements in Combined High-Hoist and Dump Wagons, of which the following is a specification.

This invention relates to wagons and more particularly to motor driven vehicles of the truck type which are provided with means whereby their bodies may be inclined for dumping—or raised and tilted to discharge the contents and thereafter returned to the normal position or seated on the vehicle underframe or chassis.

The primary object of this invention is to provide a combined high-hoist and dump wagon characterized by a novel mechanism for raising the body portion high to discharge its contents, or simply inclining the same relative to the underframe or chassis for ordinary dumping purposes.

Another object of this invention is to provide a combined high-hoist and dump-wagon characterized by the fact that the raising, lowering and inclining of the body portion is effected by a fluid controlled and actuated mechanism.

A further object of this invention is to provide a novel form of power take-off and reverse mechanism for effecting the operation and reversal of the fluid controlled and actuated mechanism.

With the foregoing and other objects in view as will become more apparent from the following description, my invention essentially consists in the novel features of construction, combinations of elements and arrangement of parts hereinafter fully disclosed by the following text, the scope of said invention being later on more specifically defined by the appended claims.

In the further disclosure of the invention reference is to be had to the accompanying sheets of explanatory drawings constituting a part of this specification, and in which like characters of reference designate the same or corresponding parts in all the views.

Figure 1— is a side elevation of a motor truck or wagon having my invention applied thereto, the body and its hoisting and inclining mechanism being shown in the high-hoist position, whilst said inclining mechanism is also illustrated by full lines in the normal position, the dotted line positions of said mechanism and body portion being later on more specifically referred to.

Figure 2— is an enlarged detail view of a lever connection and inter-locking dog.

Figure 3— is an enlarged plan view of the inter-locking dog referred to in Figure 2.

Figure 4— is a top plan view of the body raising, lowering and inclining mechanism drawn to an enlarged scale.

Figure 5— is a detached elevational view illustrative of the fluid actuated mechanism and its connection with the power take-off and reversal mechanism.

Figure 6— is an enlarged sectional elevation of the fluid actuated mechanism.

Figure 7— is a fragmentary detail and detached view of a valve control hereafter more particularly described.

Figure 8— is a part sectional plan view of the power take-off and reverse mechanism shown in connection with the preceding figures.

Figure 9— is a sectional plan view of a modified form of mechanism which may be employed instead of the fluid controlled actuating mechanism.

Figure 10:
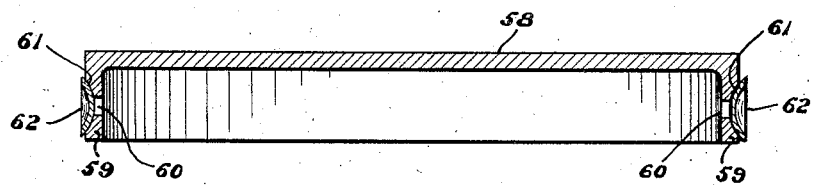
Figure 11:
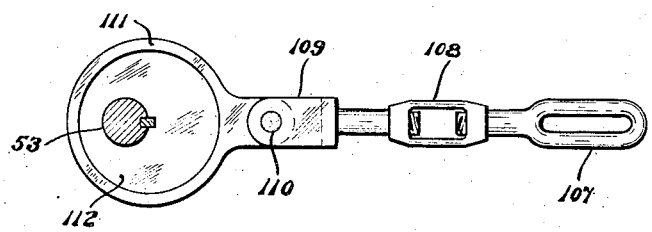

Figure 10— is an enlarged sectional view taken through the fluid control rotatable piston: and, Figure 11— is an enlarged detail of an adjustable eccentric device hereafter fully explained.

Referring more particularly to Figures 1 to 4 of the accompanying drawings the numeral 12 designates the chassis or underframe of an ordinary motor truck, 13 the wheels, 14 the motor, 15 the driver's hood, 16 the steering wheel, 17 the brake control, and 18 the transmission gear case, all of said parts being briefly enumerated and forming no part of this invention.

The dump box or body 19 is of any of the well known patterns and it is fitted on its underside with longitudinal channel beams 20 or a frame made up of such cross section members, whilst a chute or hopper discharge is indicated by the numeral 21. Appropriately pivoted on stout bolts 22—or a transverse shaft—carried by the chassis or underframe 12 and on the outer sides thereof are a pair of longitudinally disposed levers 23 which are rigidly braced in spaced relation by tie-rods or the like 24 connected thereto in any of the well known ways. The other or forward ends of these longitudinally disposed levers 23 have rigidly clamped or otherwise secured thereto strong bolts or studs 25, the shanks whereof are passed through longitudinal slots 26 in the webs of the aforementioned channel beams 20, and it will be observed on an examination of Figure 4 that the heads 27 of said bolts or studs 25 serve to prevent lateral displacement of the same whilst retaining said bolts or studs in operative connection with the said channel beams 20.

Suitably secured in the aforesaid longitudinally disposed levers 23 intermediate their ends are stud bearing members 28 on which are pivoted the forked ends 29 of forwardly directed levers or links 30, and between said forked ends 29 are pivoted—on the same stud bearing members 28—the forward ends of links 31, anti-friction spacing washers 32 serving as distance pieces between the aforesaid levers 23, forked ends 29 and the stud bearing members' heads 33 to maintain the several parts in easy working relation as well as to prevent any tendency to frictional binding. The rear ends of the aforesaid links 31 are fulcrumed at 34 on the outer ends of bearing studs or the like 35 securely fixed at 36 to the webs of the aforementioned channel beams 20 below the dumpbox or body 19, and said links 31 are provided with depending heel portions 37 at their forward ends for coaction with interlocking devices or dogs 38 slidably and removably mounted between the forked ends 29 of the forwardly directed levers or links 30 for a purpose later on explained. These slidably and removably mounted interlocking devices or dogs 38 each comprise a main or body portion 39 as will be best seen from Figures 2 and 3 which is of a dimension transversely to be a sliding fit between the forked ends 29, a substantial rectangular head 40 of the same depth as the body portion 39, and said head 40 is stepped or notched at 41 for engagement by the correspondingly shaped part 42 of the depending heel portions 37 in the above referred to links 31. In order that the inter-locking devices or dogs 38 may be slid or moved between the forked ends 29 of the forwardly directed levers 30 they are provided with a removable cap plate or member 43 conveniently mortised or grooved at 44 to snugly fit the body portions 39 of said inter-locking devices or dogs 38, and said cap plates or members 43 are securely held in place by cap screws or studs 45 as will be clearly understood by those acquainted with the art to which this invention appertains. To hold the aforesaid inter-locking devices or dogs 38 in place—or at the requisite position for co-action with the heel portions 37 of the links 31 I employ a locking pin 46 adapted for insertion through registering holes in the forked ends 29 and a transverse hole 47 in the body portions 39 of said inter-locking devices or dogs 38, a chain or the like 48 being attached at one end to the locking pin 46 and at its other end 49 secured to the forwardly directed levers or links 30 whereby loss or misplacement is prevented. Now it will be perfectly obvious that when the locking pins 46 are withdrawn the inter-locking devices or dogs 38 may be slid or moved away from the position shown by the drawings to abut the inner end 50 of the forked portions 29 whereupon the heel portions 37 of the links 31 can ride or be moved freely thereover or without contact thereagainst, said provision being made for a purpose later on fully explained.

Pivotally connected at 51 to the forward ends of the aforesaid forwardly directed levers or links 30 are links 52 the other ends whereof are rigidly keyed or otherwise secured on the outer ends of a transverse shaft 53 journaled in appropriate bearings 54 mounted on the chassis or underframe 12, said shaft 53 passing through what may be termed the primary cylinder 55 of the fluid actuating mechanism which is more fully and clearly illustrated by Figures 5 to 8 of the accompanying drawings. From the drawings it will be clearly seen that the said fluid actuating mechanism comprises the aforementioned primary cylinder 55 which is provided with a base portion 56 that is conveniently bolted or otherwise attached to transverse bearers 57 that serve the dual purposes of aiding in the support of this part of the mechanism as well as bracing same against lateral displacement. These transverse bearers 57 are conveniently bolted to the chassis or underframe 12 and it will be seen that the aforesaid shaft 53 is fitted with a piston 58 provided with a depending flange 59 apertured at intervals with small holes 60—Figure 10—and that its edge is grooved or channeled at 61 to constitute a seat for a cupped leather washer or the like 62 that serves to ensure a liquid proof joint as between said piston 58 and the primary cylinder 55, whereas the small holes 60 provide for the pressure of the fluid—such as oil—to exert a pressure at the back of the cupped leather 62 and thereby maintain an absolutely non-leakable joint. It is also to be seen that the primary cylinder 55 is formed with an integral and radial partition or diaphragm 63 which is ported at 64 for the flow of the fluid from one side thereof to the other as later on explained.

Bolted or otherwise secured by bolts 65 to a flange 66 on the aforesaid primary cylinder 55 are a pair of integral secondary cylinders 67, 68 that are divided from the primary cylinder 55 by a partition 69—Figure 6—and in said secondary cylinders 67, 68 are pistons 70, 71 respectively, the piston rods 72, 73 whereof are pivoted cranks 74, 75 on a common crankshaft 76 journaled in bearings 77 supported in any convenient manner by the chassis or underframe 12. This crankshaft 76 is provided at one end with a bevel gear 78 in mesh with a similar gear 79 on a stub axle 80 journaled in a bearing 81 supported by the underframe or chassis 12; and keyed or otherwise securely fastened on said stub-axle 80 is a sprocket wheel 82 over which passes a chain drive 83 in turn engaging on a second sprocket wheel 84 mounted on the rear end of the power take-off shaft 85 supported by a bearing 86 and connecting into the reverse clutch gear box 87—Figures 5 and 8—conveniently mounted on the one side of the aforesaid transmission gear case 18. The take-off gear or pinion from the transmission is indicated by the numeral 88—Figure 8—and it is always in mesh with a toothed wheel 89 integral with a bevel gear 90 on the aforsesaid take-off shaft 85, said latter gear 90 meshing into a bevel gear 91 in turn always in mesh with a third bevel gear 92 opposed to said bevel gear 90. The bevel gears 90 and 92 are collared on the power take-off shaft 85 so as to be freely rotatable thereon, whilst the take-off gear or pinion 88 is mounted on a shaft 93 journaled in bearings 94 provided for the purpose integral with the reverse clutch gear box 87, whereas the bevel gear 91 is keyed on a shaft 95 journaled in a bearing 96 provided for the purpose in said gear box 87. It is to be here particularly noted that the shaft 95 is shown extended somewhat and broken as in some cases I may desire to connect said shaft up with some other motive mechanism or part of the machine required to be independently driven.

Slidably mounted in bearings 97 provided for the purpose in the aforesaid reverse clutch gear box 87 is a longitudinal rod or shaft 98 fitted with forks 99, 100 which co-operate with toothed dog clutches 101, 102 respectively splined on the shaft 85 and adapted to co-act with correspondingly shaped teeth on the backs of the aforesaid bevel gears 90, 92 whereby the reversal of the power take-off mechanism is effected. An appropriate forked end 103 is provided at the forward end of the rod or shaft 98 for connection in any suitable manner with a hand lever 104 provided for the purpose in the driver's hood 15.

In order to provide an automatic means or knock-out for moving the shaft 98 to its normal or neutral position when the dump box or body 19 has reached its desired limits of movement in either direction I provide the aforesaid shaft or rod 98 on its rear end with an eye piece 105 to which may be attached one end of a rod or lever 106 the other end whereof is coupled to an elongated link 107—Figure 11—in turn adjustably connected by a turnbuckle 108 to a forked member 109 pivoted at 110 to an eccentric strap 111 on an eccentric 112 keyed or otherwise securely mounted on the aforementioned transverse shaft 53. Thus it will be readily seen that when the piston 58 has traveled its desired distance the power reverse mechanism will be thrown into the neutral or inoperative position automatically.

Referring back again to the fluid actuating mechanism and more particularly to Figures 6 and 7 of the drawings it will be seen that the secondary cylinder 67 is connected with the primary cylinder 55 by a bent inlet pipe or conduit 113 and a straight exhaust or outlet conduit 114, whereas the secondary cylinder 68 is in communication with the primary cylinder 55 by a straight inlet pipe or conduit 115 and a bent exhaust or outlet pipe 116, all of said inlet and outlet connections being fitted with one-way butterfly or check valves 117 the function and operation whereof will be clearly comprehended by those acquainted with the art to which this invention appertains, as well as the indicating arrows shown on the referred to figure.

In order to provide a manually operable bleed whereby the fluid may be easily exhausted from one side of the radial partition or diaphragm 63 to the other, I preferably employ the means shown most clearly by Figure 7, said means comprising a screw-cock 118 operable by a key or handle 119. This screw-cock 118 is provided with an aperture or hole 120 therethrough which may be easily turned or brought into register with holes 121 in the aforesaid radial partition or diaphragm 63, whereupon it will be easily seen that a free passage will be provided for the flow of the fluid from the upper to the lower side of said partition or diaphragm 63 when desired.

In some instances where it may not be convenient to use the fluid actuated control mechanism hereinbefore described I may make use of the mechanical means illustrated by Figure 9 for operating the transverse shaft 53, said means comprising a gear casing or box 122 through which said shaft 53 is journaled, and in said casing or box 122 are likewise journaled a pair of spaced shafts 123, 124. Keyed or otherwise secured on the transverse shaft 53 are a pair of spaced toothed wheels 125 in mesh with pinions 126 on the shaft 123; and similarly mounted on said shaft 53 are a pair of spaced toothed gears 127 in turn meshing with spaced pinions 128 on the second mentioned shaft 124. Between the last mentioned pinions 128 and on the shaft 124 is a worm wheel 129 that is adapted to be driven by a worm 130 formed on or securely fixed to the end of the power take-off shaft 85 which is projected into and journaled in a bearing 131 provided for the purpose in the end of the aforesaid gear casing or box 122. Thus it will be clearly seen that a very powerful and efficient reduction as well as elevating gear is provided which may have provided in connection therewith any appropriate knock-out mechanism such as has been hereinbefore described in connection with the fluid actuated control mechanism.

The construction, assembly and inter-relation of the several parts having been fully set forth by reference to the different views it will now be clearly apparent that when the dump box or body 20 is resting in a horizontal or the normal position on the chassis or underframe 12 as indicated by the dot-and-dash position designated by the letter $a$ in Figure 1, and it is desired to elevate the same to the high-hoist dumping position shown by the full lines generally characterized by the letter $b$, the operator or driver of the truck will move the hand or control lever 104 from the neutral to the desired position for moving the power take-off longitudinally movable rod or shaft 98. This movement of said rod or shaft 98 in the requisite direction will result in the proper toothed dog clutch—101 for example—being thrown into gear with its adjacent bevel gear 90 and thereby effecting a rotation of the power take-off shaft 85 through the pinion and toothed wheel 90. Consequent upon the rotation of the power take-off shaft 85 in a right-hand direction—for instance—it will be readily seen that the chain drive 83 will effect a rotation of the sprocket 82 and sub-axle 80, as well as the bevel gear 79. Rotation of the bevel gear 79 will in turn cause a partial or half turn to be imparted to the crankshaft 76, which in turn will effect the outermost piston 71 —for instance—and drive the same inwards thereby forcing the fluid out of the cylinder 68 through the bent outlet 116 into the primary cylinder 55 to the back of the piston 58. Now it will be perfectly obvious that this increase of fluid pressure so to speak at the back of the piston 58 will cause its movement in the direction of the arrow in Figure 6 from the position shown by the full lines to that indicated by the dotted lines and thereby imparting a half turn to the transverse shaft 53. As the transverse shaft 53 is turned as above set forth it will be easily seen that the links 52 will be swung from the normal or depending angular position below the chassis 12 as shown in Figure 1 in an upward or contra-clockwise direction, carrying with them the forked levers 30, said movement causing the elevation of the links 31 and the upward arcuate swinging of the longitudinal levers 23 on their pivot studs or transverse shaft 22. Now it will be perfectly obvious that as a result of the foregoing movement the dump box or body 19 will be raised and inclined and that due to the engagement of the interlocking devices or dogs 38 with the depending heel portions 37 of the links 31 said dump box or body 19 will be carried upwards and rearwards into proper dumping position, the slotted connection between the parts 25, 26 permitting the requisite rearward travel or movement of the dump box or body.

As the dump box or body 19 reaches the desired high-hoist dumping position it is to be noted that the eccentric 112 will have been turned sufficiently for the strap 111 thereof and connected parts 109, 108, 107 and 106 to have been moved sufficient to pull or move the rod 98 to withdraw the dog clutch 101 from operative engagement with the bevel gear 90 or back into neutral position.

When the dump box or body 19 is to be returned to its normal position on the chassis 12 the operator or driver of the motor vehicle moves the aforementioned hand or control lever 104 in an opposite direction which effects a reverse rotation of the power take-off shaft 85 and through the mechanism hereinbefore described returns the parts to normal position. Or said return of the dump box or body 19 may be effected by opening the screw cock 118 thereby permitting the excess pressure of the fluid on the upper side of the piston 58 to be automatically reduced when the several parts will gravitate back under their own weight.

On the other hand, when it is simply desired to dump the box or body 19 as indicated by the dot-and-dash position designated by the letter $c$ on Figure 1, the locking pins 46 are withdrawn which permits the interlocking devices or dogs 38 to recede or slide downwards in the forked ends 29 of the levers 30, whereupon the links 31 are rendered inoperative for raising purposes when it will be readily seen that as the mechanism hereinbefore described is operated said dump box or body 19 will simply be rocked or swung upwards upon the stud bolts or transverse shaft 22 as a pivot.

From the foregoing description and explanation of the operation of my invention, its practicability and usefulness will be self-evident, whereas its easy application to new or existing motor trucks will be clearly apparent.

Whilst there has been shown and minutely described one practical embodiment of my said invention it will be perfectly obvious that many detail changes may be effected, and other combinations of the several parts arranged without in any way departing from the spirit of my said invention, and the right is hereby reserved to include all such changes and other combinations thereof as fairly lie within the scope of the appended claims.

Having described my invention, what I claim as new and desire to secure by Letters Patent is:

1. In a combined high-hoist and dump wagon the combination with the understructure, body and transmission thereof, of power take-off mechanism actuable from the transmission, fluid controlled and actuated means operable by said power take-off mechanism for partially rotating a transverse shaft, said shaft being journaled on the understructure, rock lever mechanism adapted for oscillation by said transverse shaft to effect the raising of the body high, to discharge its contents or simply inclining the same relative to the understructure for ordinary dumping, and means for automatically shifting the power take-off mechanism into neutral as the aforesaid body reaches its limits of movement.

2. In a combined high-hoist and dump wagon the combination with the understructure, body and transmission thereof, of power take-off mechanism actuable from the transmission, fluid controlled and actuated means operable by said power take-off mechanism for partially rotating a transverse shaft journaled in the wagon understructure, said fluid controlled and actuated means comprising a primary cylinder through which the aforesaid transverse shaft axially passes, a radial partition in said primary cylinder, a radially directed piston movable with said transverse shaft, secondary cylinders divided from said primary cylinder and having inlet and exhaust conduits connecting therewith, a crank-shaft for operating the pistons in the secondary cylinders, said crank-shaft being actuated by means from the power take-off mechanism, rock lever mechanism adapted for oscillation by the aforesaid transverse shaft to effect the raising of the body high, to discharge its contents or simply inclining the same relative to the understructure for ordinary dumping, and means for automatically shifting the power take-off mechanism into neutral as the aforesaid body reaches its limits of movement.

3. In a combined high-hoist and dump wagon the combination with the understructure, body and transmission thereof, of power take-off mechanism actuable from the transmission, fluid controlled and actuated means operable by said power take-off mechanism for partially rotating a transverse shaft journaled in the wagon understructure, said fluid controlled and actuated means comprising a primary cylinder through which the aforesaid transverse shaft axially passes, a radial partition in said primary cylinder, a radially directed piston movable with said transverse shaft, said radially directed piston having an apertured flange on three sides thereof, said apertured flange being grooved in its outer wall, a cupped piston ring in said grooved part of the outer wall adapted for outward expansion by the pressure of the operating fluid passing through the apertures in the aforesaid flange, secondary cylinders divided from said primary cylinder and having inlet and exhaust conduits connecting therewith, a crank-shaft for operating the pistons in the secondary cylinders, said crankshaft being actuated by means from the power take-off mechanism, rock lever mechanism adapted for oscillation by the aforesaid transverse shaft to effect the raising of the body high, to discharge its contents or simply inclining the same relative to the understructure for ordinary dumping, and means for automatically shifting the power take-off mechanism into neutral as the aforesaid body reaches its limits of movement.

4. In a combined high-hoist and dump wagon the combination with the understructure, body and transmission thereof, of power take-off mechanism actuable from the transmission, fluid controlled and actuated means operable by said power take-off mechanism for partially rotating a transverse shaft journaled in the wagon understructure, said fluid controlled and actuated means comprising a primary cylinder through which the aforesaid transverse shaft axially passes, a radial partition in said primary cylinder, the inlet and exhaust conduits from one of a pair of secondary cylinders connecting with the primary cylinder on the upper side of the radial partition, and the inlet and exhaust conduits from the other secondary cylinder connecting with the primary cylinder below the aforesaid radial diaphragm, a radially directed piston movable with said transverse shaft, said radially directed piston having an apertured flange on three sides thereof, said apertured flange being grooved in its outer wall, a cupped piston ring in said grooved part of the outer wall adapted for outward expansion by the pressure of the operating fluid passing through the apertures in the aforesaid flange, secondary cylinders divided from said primary cylinder and having inlet and exhaust conduits connecting therewith, a crankshaft for operating the pistons in the secondary cylinders, said crank-shaft being actuated by means from the power take-off mechanism, rock lever mechanism adapted for oscillation by the aforesaid transverse shaft to effect the raising of the body high to discharge its contents or simply inclining the same relative to the understructure for ordinary dumping, and means for automatically shifting the power take-off mechanism into neutral as the aforesaid body reaches its limits of movement.

5. In a combined high-hoist and dump wagon the combination with the understructure, body and transmission thereof, of power take-off mechanism actuable from the transmission, fluid controlled and actuated means operable by said power take-off mechanism for partially rotating a transverse shaft journaled in the wagon understructure, said fluid controlled and actuated means comprising a primary cylinder through which the aforesaid transverse shaft axially passes, a radial partition in said primary cylinder, the inlet and exhaust conduits from one of a pair of secondary cylinders connecting with the primary cylinder on the upper side of the radial partition, and the inlet and exhaust conduits from the other secondary cylinder connecting with the primary cylinder below the aforesaid radial diaphragm, check valves in said inlet and exhaust conduits, a radially directed piston movable with said transverse shaft, said radially directed piston having an apertured flange on three sides thereof, said apertured flange being grooved in its outer wall, a cupped piston ring in said grooved part of the outer wall adapted for outward expansion by the pressure of the operating fluid passing through the apertures in the aforesaid flange, secondary cylinders divided from said primary cylinder and having inlet and exhaust conduits connecting therewith, a crankshaft for operating the pistons in the secondary cylinders, said crankshaft being actuated by means from the power take-off mechanism, rock lever mechanism adapted for oscillation by the aforesaid transverse shaft to effect the raising of the body high to discharge its contents or simply inclining the same relative to the understructure for ordinary dumping, and means for automatically shifting the power take-off mechanism into neutral as the aforesaid body reaches its limits of movement.

6. In a combined high-hoist and dump wagon the combination with the understructure, body and transmission thereof, of power take-off mechanism actuable from the transmission, fluid controlled and actuated means operable by said power take-off mechanism for partially rotating a transverse shaft journaled in the wagon understructure, said fluid controlled and actuated means comprising a primary cylinder through which the aforesaid transverse shaft axially passes, a radial partition in said primary cylinder, a manually operable screw-cock in the radial partition whereby the pressure on either side of the radially directed piston may be equalized to permit the moving parts to gravitate to their normal position, a radially directed piston movable with said transverse shaft, said radially directed piston having an apertured flange on three sides thereof, said apertured flange being grooved in its outer wall, a cupped piston ring in said grooved part of the outer wall adapted for outward expansion by the pressure of the operating fluid passing through the apertures in the aforesaid flange, secondary cylinders divided from said primary cylinder and having inlet and exhaust conduits connecting therewith, a crankshaft for operating the pistons in the secondary cylinders, said crankshaft being actuated by means from the power take-off mechanism, rock lever mechanism adapted for oscillation by the aforesaid transverse shaft to effect the raising of the body high to discharge its contents or simply inclining the same relative to the understructure for ordinary dumping, and means for automatically shifting the power take-off mechanism into neutral as the aforesaid body reaches its limits of movement.

7. In a combined high-hoist and dump wagon the combination with the understructure, body and transmission thereof, of power take-off mechanism actuable from the transmission, fluid controlled and actuated means operable by said power take-off mechanism for partially rotating a transverse shaft journaled in the wagon understructure, said fluid controlled and actuated means comprising a primary cylinder through which the aforesaid transverse shaft axially passes, a radial partition in said primary cylinder, a manually operable screw-cock in the radial partition whereby the pressure on either side of the radially directed piston may be equalized to permit the moving parts to gravitate to their normal position, a radially directed piston movable with said transverse shaft, said radially directed piston having an apertured flange on three sides thereof, said apertured flange being grooved in its outer wall, a cupped piston ring in said grooved part of the outer wall adapted for outward expansion by the pressure of the operating fluid passing through the apertures in the aforesaid flange, secondary cylinders divided from said primary cylinder and having inlet and exhaust conduits connecting therewith, a crankshaft for operating the pistons in the secondary cylinders, said crank-shaft being driven from the power take-off mechanism by a chain drive and bevel gears, rock lever mechanism adapted for oscillation by the aforesaid transverse shaft to effect the raising of the body high to discharge its contents or simply inclining the same relative to the understructure for ordinary dumping, and means for automatically shifting the power take-off mechanism into neutral as the aforesaid body reaches its limits of movement.

8. In a combined high-hoist and dump wagon the combination with the understructure, body and transmission thereof, of power take-off mechanism actuable from the transmission, said power take-off mechanism including a take-off shaft journaled in a casing for fixture on the transmission gear case, opposed bevel gears loosely collared on the take-off shaft and an inter-meshing independently journaled bevel gear, one of said opposed bevel gears having an integral spur gear meshing with a pinion driven direct from the transmission, dog clutches splined on the take-off shaft adapted to be moved into mesh with the requisite bevel gear to rotate the take-off shaft to the right or left-hand as desired, means for effecting the movement of the dog clutches, fluid controlled and actuated means operable by said power take-off mechanism for partially rotating a transverse shaft journaled in the wagon understructure, rock lever mechanism adapted for oscillation by said transverse shaft to effect the raising of the body high to discharge its contents or simply inclining the same relative to the understructure for ordinary dumping, and means for automatically shifting the power take-off mechanism into neutral as the aforesaid body reaches its limits of movement.

9. In a combined high-hoist and dump wagon the combination with the understructure, body and transmission thereof, of power take-off mechanism actuable from the transmission, said power take-off mechanism including a take-off shaft journaled in a casing for fixture on the transmission gear case, opposed bevel gears loosely collared on the take-off shaft and an inter-meshing independently journaled bevel gear, one of said opposed bevel gears having an integral spur gear meshing with a pinion driven direct from the transmission, dog clutches splined on the take-off shaft adapted to be moved into mesh with the requisite bevel gear to rotate the take-off shaft to the right or left-hand as desired, means for effecting the movement of the dog clutches, said means comprising a longitudinally movable rod having forks thereon co-operating with the dog clutches, fluid controlled and actuated means operable by said power take-off mechanism for partially rotating a transverse shaft journaled in the wagon understructure, rock lever mechanism adapted for oscillation by said transverse shaft to effect the raising of the body high to discharge its contents or simply inclining the same relative to the understructure for ordinary dumping, and means for automatically shifting the power take-off mechanism into neutral as the aforesaid body reaches its limits of movement.

10. In a combined high-hoist and dump wagon the combination with the understructure, body and transmission thereof, of power take-off mechanism actuable from the transmission, said power take-off mechanism including a take-off shaft journaled in a casing for fixture on the transmission gear case, opposed bevel gears loosely collared on the take-off shaft and an inter-meshing independently journaled bevel gear, one of said opposed bevel gears having an integral spur gear meshing with a pinion driven direct from the transmission, dog clutches splined on the take-off shaft adapted to be moved into mesh with the requisite bevel gear to rotate the take-off shaft to the right or left-hand as desired, means for effecting the movement of the dog clutches, said means comprising a longitudinally movable rod having forks thereon co-operating with the dog clutches, fluid controlled and actuated means operable by said power take-off mechanism for partially rotating a transverse shaft journaled in the wagon understructure, rock lever mechanism adapted for oscillation by said transverse shaft to effect the raising of the body high to discharge its contents or simply inclining the same relative to the understructure for ordinary dumping, means for automatically shifting the power take-off mechanism into neutral as the aforesaid body reaches its limits of movement, said means comprising an eccentric on the aforesaid transverse shaft the shaft whereof is connected by a turnbuckle, elongated link and connecting rod to the aforesaid longitudinally movable rod whereby said longitudinally movable rod is only actuated to disconnect the dog clutches, and throw the power take-off mechanism into neutral as the aforesaid body arrives at its limits of movement.

11. In a combined high-hoist and dump wagon the combination with the understructure, body and transmission thereof, of power take-off mechanism actuable from the transmission, fluid controlled and actuated means operable by said power take-off mechanism for partially rotating a transverse shaft journaled in the understructure of the wagon, arcuately movable levers fixed on the aforesaid transverse shaft, the free ends whereof are pivotally connected to forwardly directed levers having their other ends forked, said forked ends being pivoted on stud bearings intermediate the ends of longitudinally disposed levers, the rear ends of the longitudinal levers being pivoted to the chassis and the forward ends pivoted to the underframe of the wagon body, links having one end thereof pivoted between the aforesaid forked ends and the other ends pivoted to the body underframe, and means for automatically shifting the power take-off mechanism into neutral as the aforesaid body reaches its limits of movement.

12. In a combined high-hoist and dump wagon the combination with the understructure, body and transmission thereof, of power take-off mechanism actuable from the transmission, fluid controlled and actuated means operable by said power take-off mechanism for partially rotating a transverse shaft journaled in the understructure of the wagon, arcuately movable levers fixed on the aforesaid transverse shaft, the free ends whereof are pivotally connected to forwardly directed levers having their other ends forked, said forked ends being pivoted on stud bearings intermediate the ends of longitudinally disposed levers, the rear ends of the longitudinal levers being pivoted to the chassis and the forward ends having a sliding pivotal connection with the underframe of the wagon body, links having one end thereof pivoted between the aforesaid forked ends and the other ends pivoted to the body underframe, and means for automatically shifting the power take-off mechanism into neutral as the aforesaid body reaches its limits of movement.

13. In a combined high-hoist and dump wagon the combination with the understructure, body and transmission thereof, of power take-off mechanism actuable from the transmission, fluid controlled and actuated means operable by said power take-off mechanism for partially rotating a transverse shaft journaled in the understructure of the wagon, arcuately movable levers fixed on the aforesaid transverse shaft, the free ends whereof are pivotally connected to forwardly directed levers having their other ends forked, said forked ends being pivoted on stud bearings intermediate the ends of longitudinally disposed levers, the rear ends of the longitudinal levers being pivoted to the chassis and the forward ends having a sliding pivotal connection with the underframe of the wagon body, links having one end thereof pivoted between the aforesaid forked ends and the other end pivoted to the body underframe, interlocking devices mounted between the hereinbefore referred to forked ends, said interlocking devices being adapted to co-operate with the links to effect the elevation of the wagon body when in the high-hoist position, and means for automatically shifting the power take-off mechanism into neutral as the aforesaid body reaches its limits of movement.

14. In a combined high-hoist and dump wagon the combination with the understructure, body and transmission thereof, of power take-off mechanism actuable from the transmission, fluid controlled and actuated means operable by said power take-off mechanism for partially rotating a transverse shaft journaled in the understructure of the wagon, arcuately movable levers fixed on the aforesaid transverse shaft, the free ends whereof are pivotally connected to forwardly directed levers having their other ends forked, said forked ends being pivoted on stud bearings intermediate the ends of longitudinally disposed levers, the rear ends of the longitudinal levers being pivoted to the chassis and the forward ends having a sliding pivotal connection with the underframe of the wagon body, links having one end thereof pivoted between the aforesaid forked ends and the other end pivoted to the body underframe, interlocking devices consisting of slidable dogs adapted to fit between the hereinbefore referred to forked ends, means for retaining said slidable dogs in position, said interlocking devices being adapted to co-operate with the links to effect the elevation of the wagon body when in the high-hoist position, and means for automatically shifting the power take-off mechanism into neutral as the aforesaid body reaches its limits of movement.

15. In a combined high-hoist and dump wagon the combination with the understructure, body and transmission thereof, of power take-off mechanism actuable from the transmission, fluid controlled and actuated means operable by said power take-off mechanism for partially rotating a transverse shaft journaled in the understructure of the wagon, arcuately movable levers fixed on the aforesaid transverse shaft, the free ends whereof are pivotally connected to forwardly directed levers having their other ends forked, said forked ends being pivoted on stud bearings intermediate the ends of longitudinally disposed levers, the rear ends of the longitudinal levers being pivoted to the chassis and the forward ends having a sliding pivotal connection with the underframe of the wagon body, having one end thereof pivoted between the aforesaid forked ends and the other end pivoted to the body underframe, said links adjacent their connection with the forked ends being formed with depending heel portions, interlocking devices consisting of slidable dogs adapted to fit between the hereinbefore referred to forked ends, stepped portions on the slidable dogs for cooperation with the depending heel portions of the links, means for retaining said slidable dogs in position, removable means for locking said slidable dogs relative to the forked ends so as to co-operate with the depending heel portions to effect the elevation of the wagon body when in the high-hoist position, and means for automatically shifting the power take-off mechanism into neutral as the aforesaid body reaches its limits of movement.

In testimony whereof I affix my signature.

JOSEPH GASSER.